Patented Sept. 5, 1950

2,521,514

UNITED STATES PATENT OFFICE 2,521,514

PHOSPHORIC ACID POLYMERIZATION OF THIOPHENE COMPOUNDS

Howard D. Hartough, Pitman, and Seymour L. Meisel, Woodbury, N. J., assignors to Socony-Vacuum Oil Company, Incorporated, a corporation of New York No Drawing. Application July 15, 1948, Serial No. 38,954

17 Claims. (Cl. 260—329)

This invention relates to a process for the polymerization of thiophenes and, more particularly, is directed to a method for polymerizing thiophene and alkyl-substituted thiophenes in the presence of an orthophosphoric acid catalyst.

Prior to the present invention, thiophene and its alkyl derivatives have been polymerized by the use of sulfuric acid or other strong acids, such as dihydroxyfluoboric acid. The polymerized products so obtained have been black, granular, solid materials of exceedingly high molecular weight which are insoluble in petroleum lubricating oils and quite different from the products obtained by the process described herein.

In accordance with the present invention, it has been discovered that thiophene or alkyl-substituted thiophenes will polymerize in the presence of approximately 100 per cent orthophosphoric acid to yield a product of comparatively low molecular weight made up principally of the trimer and pentamer of the particular thiophene reactant involved. The products so obtained are characterized by solubility in petroleum lubricating oil fractions. This property of oil-solubility is particularly valuable where it is desirable to use a thiophene compound as an improving agent for petroleum lubricating oils by incorporating a small proportion of the additive compound in the oil. In this respect, the products of the present invention have been found to be valuable anti-oxidants in stabilizing mineral oils against the deleterious effects of oxidation. Furthermore, the products of polymerized thiophene and alkylthiophenes obtained in accordance with the catalytic process of this invention have been found to be excellent plasticizing agents and to possess other valuable properties not exhibited by the higher polymers of thiophene and alkylthiophenes.

It is, accordingly, an object of the present invention to provide an efficient process for polymerizing thiophene compounds to low molecular weight products. Another object is to provide a process for catalytically polymerizing thiophene or alkylthiophene to produce mixtures composed substantially of trimeric and pentameric polymers. A still further object is to afford a process for catalytically polymerizing thiophene and its alkyl derivatives in a relatively simple and direct manner by the use of minute amounts of an inexpensive, readily available catalyst. A very important object is to provide a process for synthesizing the trimer and pentamer of thiophene and alkylthiophene.

These and other objects which will be recognized by those skilled in the art are attained in accordance with the present invention, wherein thiophene or alkyl-substituted thiophene is polymerized in the presence of a small quantity of approximately 100 per cent orthophosphoric acid.

It has thus been found that an orthophosphoric acid catalyst effects the polymerization of thiophene and alkylthiophenes smoothly and specifically to give a low molecular weight reaction product consisting substantially of the trimeric and pentameric polymers in contrast to the black, petroleum-insoluble complex reaction mixtures of appreciably higher molecular weight polymers such as obtained in the presence of sulfuric and other strong acids.

The thiophene compounds treated in accordance with the process of this invention include thiophene and the monoalkylthiophenes. Representative of the latter compounds are 2-methylthiophene, 3-methylthiophene, 2-isopropylthiophene, 2-t-butylthiophene, 3-t-butylthiophene, 2-t-amylthiophene, 2-s-butylthiophene, 2-s-hexadecylthiophene, and the mixed alkylthiophenes derived from the olefins of cracked wax or from various other sources. The above list is not to be considered as exhaustive since any of the other known monoalkylthiophenes or mixtures thereof may likewise be treated by the process described herein. Polyalkyl-substituted thiophenes may also be employed as the starting material but it has not been ascertained whether or not they polymerize as such or break down into monoalkylthiophenes and olefins during the reaction. It appears possible that they do break down into monoalkylthiophenes during the reaction and that the olefins produced react with the product to at least partially alkylate it. It is also contemplated that thiophene compounds containing other substituents than alkyl radicals may be polymerized by the process of this invention, provided, of course, that the substituents are such that they do not otherwise interfere with the reaction.

The concentration of orthophosphoric acid employed is an important factor in the process of this invention. It has been found essential, as will be shown hereinafter, to employ orthophosphoric acid of approximately 100 per cent concentration in order to control the polymerization reaction in the desired manner and to obtain a reaction product of low molecular weight polymers. Thus, the use of ordinary 85 per cent orthophosphoric acid as a catalyst failed to promote the polymerization of thiophene to any appreciable extent. Similarly, the anhydride of orthophosphoric acid, i. e., phosphorus pentoxide, was not an effective catalyst for the polymerization of thiophene or alkylthiophenes. The catalyst of approximately 100 per cent orthophosphoric acid is generally employed in the present process in amounts of between about 0.01 and about 1 part by weight per weight of thiophene compound. Preferably, the weight ratio of catalyst to thiophene compound is between about 0.05 and about 0.5.

The process of polymerization in accordance with the present invention may be carried out either in batch operation or by a continuous procedure. In some instances, particularly where it is desired to effect continuous operation, the orthophosphoric acid catalyst is suitably supported or deposited on various materials of the nature of kieselguhr, siliceous gels, porous glasses, various naturally occurring clays and synthetic porous composites commonly employed in the art as catalyst supporting materials.

The polymerization of thiophene and alkylthiophenes is thus carried out in accordance with the process of this invention by contacting the thiophene reactant with approximately 100 per cent orthophosphoric acid. The temperature of the reaction mixture is then raised. Generally, the upper limit of temperature at which the process is carried out will be dependent upon the boiling point of the particular reactant used at the specific pressure of the reaction. In general, temperatures between about 50° C. and about 200° C. have been found satisfactory for effecting the polymerization reaction. The influence of increased pressure from a practical standpoint does not have a very great effect on reactions such as those involved herein, which readily proceed at normal pressures. Accordingly, the process of this invention ordinarily is carried out under atmospheric pressure, although with the use of higher temperatures, pressure sufficient to maintain the reactants in the liquid phase may be employed. As a practical matter, the reaction mixture will usually be maintained at the reflux temperature of the thiophene compound being treated. Thus, in the case of thiophene, the reaction temperature will normally be maintained within the range of about 75° C. to about 100° C. When monoalkylthiophenes are being treated, the temperature will be correspondingly increased, depending on the boiling point of the particular alkylthiophene undergoing polymerization. The use of temperatures lower than about 50° C. is to be strictly avoided since such temperatures do not favor the polymerization of thiophene and alkylthiophenes in the presence of orthophosphoric acid.

The reaction time required will depend in part on the temperature employed, the amount of catalyst present, and the thiophene compound undergoing treatment. The reaction time will also depend upon the nature of the final product desired. With shorter reaction times, the trimer of thiophene or alkylthiophene is obtained as the major reaction product while with the use of longer reaction times, the pentamer of thiophene or alkylthiophene may be obtained as the major product. Under the usual operating conditions encountered in the process of this invention the reaction period will generally vary from about 1 to about 72 hours and where the trimer is the desired reaction product, the reaction period will generally vary from about 1 to about 24 hours.

During the period of reaction, some hydrogen sulfide is evolved. At the completion of the reaction, any of the original thiophene compound remaining in an unreacted state is removed by steam distillation. The residue reaction product is then washed with a suitable extract to remove polymerized thiophene. The extractant layer is then removed from the catalyst by filtration and washed with caustic to remove traces of mercaptans or hydrogen sulfide which may have been formed during the course of reaction. The extractant layer is then dried and the extractant is removed therefrom by distillation. The resulting residue is a polymerized thiophene product of low molecular weight, consisting principally of a mixture of the trimeric and pentameric polymers. The pure trimer can be isolated from the thiophene polymer reaction product by distilling the latter, preferably under reduced pressure. The distillate obtained at a temperature of 170° C., at a pressure of 1.1 millimeters of mercury was found to be thiophene trimer. At 20° C., this material had a refractive index of 1.6450. The sulfur content was 37.4 (theoretical, 38.1). The molecular weight was 247 (theoretical, 252). An infra-red spectra analysis of the material definitely established that it was a trimer of thiophene characterized by the formula $C_{12}H_{12}S_3$ and having the following structural formula:

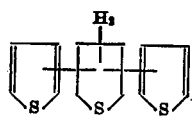

While, as indicated above, any unreacted thiophene compound present in the reaction mixture is suitably separated by steam distillation, other feasible means of removing thiophene from a reaction mixture of thiophene polymer and catalyst are contemplated by the process of this invention. Likewise, the subsequent separation of orthophosphoric catalyst and thiophene polymers may be accomplished by any convenient means. The use of an extractant miscible with the thiophene polymer product, but immiscible with the orthophosphoric acid catalyst, has afforded a preferred method of separation. Suitable extractants for this purpose include diethyl ether, benzene, chloroform, and ethyl acetate.

When thiophene is the reactant undergoing polymerization, the reaction product obtained has been found to consist principally of the trimer of thiophene, and the pentamer of thiophene, together with minor proportions of the higher polymers. The pure trimer, as pointed out above, may be readily separated from the higher polymers by distillation of the thiophene polymer product. The pure trimer is characterized by certain valuable properties which the mixture of trimer and higher polymer does not exhibit. Thus, the pure trimer possesses a solubility in petroleum lubricating oil of greater than 1 per cent by weight, while a reaction product mixture containing aproximately 70 per cent trimer and 30 per cent higher polymer was soluble in the same oil to less than 0.5 per cent by weight. The trimer, upon addition to mineral lubricating oil fractions, has been found to stabilize the same against the deleterious effects of oxidation. Hence, as will be realized, the greater solubility of the trimer in mineral oil as compared with that of the thiophene polymer mixture of trimer and higher polymers is, indeed, a valuable attribute. In addition to being mineral oil antioxidants, the thiophene trimers, pentamers, and the polymerization reaction products of thiophene and alkylthiophenes obtained in accordance with the process of this invention are useful as plasticizers, as components of rubber and other viscous, plastic, or solid masses, as protective coatings, and as compounding materials in the preparation of pharmaceutical and insecticidal compositions. The following examples will serve to illustrate the process of this invention without limiting the same:

Example 1

To 252 grams of thiophene were added 35 grams of 100 per cent orthophosphoric acid. The mixture was well agitated and was heated at reflux until the temperature rose to 96° C. This required about 6 hours. A small amount of hydrogen sulfide gas was evolved throughout the reaction.

At the end of the 6-hour heating period, about 150 cc. of water were added to the mixture. Steam distillation of the mixture yielded 60 grams of unreacted thiophene. The residue resulting from steam distillation was diluted with approximately 150 cc. of diethyl ether, the mixture filtered, and the ether layer removed from the aqueous orthophosphoric acid. The ether layer was washed twice with 10 per cent aqueous caustic and once with water. The washed ether layer was then dried over anhydrous calcium sulfate and the ether was removed by distillation. Approximately 150 grams of a light orange oil were obtained. This product contained about 80 per cent thiophene trimer and 20 per cent higher polymer, the latter having an average molecular weight of about 400 and consisting largely of thiophene pentamer. The thiophene polymer product so obtained represents a 60 per cent conversion of thiophene to polymer and a 78 per cent yield of polymer, based on reacted thiophene.

Example 2

A mixture of thiophene and 100 per cent orthophosphoric acid, the weight ratio of the latter to the former being about 0.5, was heated with agitation, in the temperature range of 84° C. to 96° C. for a period of 6 hours. At the end of this period, the reaction product mixture was diluted with a quantity of diethyl ether and water and then filtered. The resulting ether layer was removed from the aqueous orthophosphoric acid layer. The ether layer was then washed, dried, and distilled, as in Example 1, to yield a reaction product consisting of about 70 per cent thiophene trimer and about 30 per cent higher polymer (largely thiophene pentamer), and representing a 58 per cent conversion of thiophene to polymer.

Example 3

A mixture of thiophene and 100 per cent orthophosphoric acid, the weight ratio of the latter to the former being about 0.1, was heated with agitation in the temperature range of 84° C. to 100° C. for a period of 7 hours. At the end of this time, the reaction product mixture was diluted with a quantity of diethyl ether and water, and filtered. The resulting ether layer was separated from the aqueous orthophosphoric acid, washed, dried, and distilled, as in Example 1, to yield a reaction product consisting of about 70 per cent trimer and about 30 per cent higher polymer (largely thiophene pentamer), and representing a 61 per cent conversion of thiophene to polymer.

Example 4

A mixture of thiophene and 100 per cent orthophosphoric acid, the weight ratio of the latter to the former being about 0.1, was heated with agitation at a temperature of 78° C. for a period of 10 hours. Thereafter, the reaction mixture was heated over a temperature range of 78° C. to 95° C. for an additional 16 hours. At the end of this heating period, the reaction product mixture was diluted with diethyl ether and water, and filtered. The resulting ether layer was separated from the aqueous orthophosphoric acid layer, washed, dried, and distilled, as in Example 1, to yield a reaction product of polymerized thiophene, representing a 76 per cent conversion of thiophene to polymer.

Example 5

A mixture of thiophene and 100 per cent orthophosphoric acid, the weight ratio of the latter to the former being 0.05, was heated with agitation at a temperature in the range of 84° C. to 90° C. for a period of 8.5 hours. At the end of this time, unreacted thiophene was removed from the reaction product mixture by steam distillation. The residue from steam distillation was diluted with diethyl ether and filtered. The resulting ether layer was separated from the aqueous orthophosphoric acid layer, washed, dried, and distilled, as in Example 1, to yield a reaction product of polymerized thiophene, representing a 62 per cent yield of total polymer, based on reacted thiophene.

Example 6

A mixture of thiophene and 100 per cent orthophosphoric acid, the weight ratio of the latter to the former being 0.1, was heated with agitation at a temperature of 78° C. for 8.5 hours. At the end of this time, unreacted thiophene was removed from the reaction product mixture by steam distillation. The residue from steam distillation was diluted with diethyl ether, and filtered. The resulting ether layer was separated from the aqueous orthophosphoric acid layer, dried, and distilled, as in Example 1, to yield a reaction product consisting of approximately 90 per cent trimer and approximately 10 per cent of pentamer, and representing a 76 per cent yield of total polymer, based on reacted thiophene.

Example 7

A mixture of 2-methylthiophene and 100 per cent orthophosphoric acid, the weight ratio of the latter to the former being 0.05, was heated with agitation at a temperature in the range of 111–117° C. for a period of 6 hours. At the end of this time, unreacted 2-methylthiophene was removed from the reaction product mixture by steam distillation. The residue from steam distillation was diluted with diethyl ether and filtered. The resulting ether layer was separated from the aqueous orthophosphoric acid layer, dried, and distilled, as in Example 1, to yield a reaction product of polymerized 2-methlylthiophene having an average molecular weight of 329 and consisting of approximately 79 per cent of 2-methylthiophene trimer and approximately 21 per cent of 2-methylthiophene pentamer, which represents an 86 per cent yield of total polymer, based on reacted thiophene.

Example 8

A mixture of 3-methylthiophene and 100 per cent orthophosphoric acid, the weight ratio of the latter to the former being 0.05, was heated with agitation at a temperature in the range of 114–125° C. for a period of 5 hours. At the end of this time, unreacted 3-methylthiophene was removed from the reaction product mixture by steam distillation. The residue from steam distillation was diluted with diethyl ether and filtered. The resulting ether layer was separated from the aqueous orthophosphoric acid layer, dried, and distilled, as in Example 1, to yield a reaction product having an average molecular weight of 417 and consisting of approximately 37 per cent of 3-methylthiophene trimer and 63 per cent of 3-methylthiophene pentamer, which represents a 63 per cent yield of total polymer, based on reacted thiophene.

From the above example, it will be evident that 100 per cent orthophosphoric acid as an effective catalyst for promoting polymerization of thiophene and alkylthiophenes to low molecular weight products containing the trimer and pentamer as major components. For purposes of comparison, thiophene was contacted under similar reaction conditions with orthophosphoric acid of lower concentration and also with the anhydride of orthophosphoric acid (phosphorus pentoxide). These materials, in contrast to the approximately 100 per cent orthophosphoric acid employed in the process of this invention, were not effective catalysts for promoting the polymerization of thiophene. This will be readily apparent from the following examples:

Example 9

A mixture of thiophene and 85 per cent orthophosphoric acid, the weight ratio of the latter to the former being 0.33, was heated with agitation at a temperature of 84–85° C. for 18 hours. At the end of this time, the reaction product mixture was diluted with a quantity of diethyl ether and water, and then filtered. The ether layer was separated from the aqueous orthophosphoric acid layer, washed, dried, and distilled, as in the previous examples, to yield a reaction product in which only 2.8 per cent of the thiophene had been converted to polymer.

Example 10

A mixture of thiophene and phosphorus pentoxide, the weight ratio of the latter to the former being 0.05, was heated with agitation at a temperature of 84° C. for 6 hours. At the end of this time, unreacted thiophene was removed from the reaction product mixture by steam distillation. The residue from steam distillation was diluted with diethyl ether and filtered. The ether layer was removed from the aqueous orthophosphoric acid which had been produced by hydrolysis of the phosphorus pentoxide. The ether layer was then washed, dried, and distilled, as in the previous examples, to yield a reaction product in which only 5.6 per cent of the thiophene had been converted to polymer.

We claim:

1. A process for polymerization of a thiophene compound selected from the group consisting of thiophene and alkylthiophenes, which comprises contacting said compound at a temperature of not less than about 50° C. with a catalyst of approximately 100 per cent orthophosphoric acid for a period of time sufficient to effect polymerization and thereafter removing polymer of said thiophene compound as a reaction product.

2. A process of polymerization of a thiophene compound selected from the group consisting of thiophene and alkylthiophenes, which comprises contacting said compound at a temperature of between about 50° C. and about 200° C. with a catalyst of approximately 100 per cent orthophosphoric acid for a period of time sufficient to effect polymerization and thereafter removing polymer of said thiophene compound as a reaction product.

3. A process for polymerization of a thiophene compound selected from the group consisting of thiophene and alkylthiophenes, which comprises contacting said compound at reflux temperature with a catalyst of approximately 100 per cent orthophosphoric acid for a period of time sufficient to effect polymerization and thereafter removing polymer of said thiophene compound as a reaction product.

4. A process for polymerization of thiophene, comprising contacting thiophene at a temperature of not less than about 50° C. with between about 0.01 and about 1 part by weight per unit weight of thiophene of a catalyst of approximately 100 per cent orthophosphoric acid for a period of time sufficient to effect polymerization and thereafter removing thiophene polymer as a reaction product.

5. A process for polymerization of thiophene, comprising contacting thiophene at a temperature of between about 50° C. and about 200° C. with between about 0.05 and about 0.5 part by weight per unit weight of thiophene of a catalyst of approximately 100 per cent orthophosphoric acid for a period of time sufficient to effect polymerization and thereafter removing thiophene polymer as a reaction product.

6. A process for polymerization of an alkylthiophene, comprising contacting an alkylthiophene at a temperature of not less than about 50° C. with between about 0.01 and about 1 part by weight per unit weight of an alkylthiophene of a catalyst of approximately 100 per cent orthophosphoric acid for a period of time sufficient to effect polymerization and thereafter removing alkylthiophene polymer as a reaction product.

7. A process for polymerization of a thiophene compound selected from the group consisting of thiophene and alkylthiophenes, which comprises contacting said compound at a temperature of not less than about 50° C. with between about 0.01 and about 1 part by weight per unit weight of said compound of a catalyst of approximately 100 per cent orthophosphoric acid for a period of time sufficient to effect polymerization and thereafter removing polymer of said thiophene compound as a reaction product.

8. A process for polymerization of a thiophene compound selected from the group consisting of thiophene and alkylthiophenes, which comprises contacting said compound at a temperature of not less than about 50° C. with between about 0.05 and about 0.5 part by weight per unit weight of said compound of a catalyst of approximately 100 per cent orthophosphoric acid for a period of time sufficient to effect polymerization and thereafter removing polymer of said thiophene compound as a reaction product.

9. A process for polymerization of a thiophene compound selected from the group consisting of thiophene and alkylthiophenes, which comprises contacting said compound at a temperature of between about 50° C. and about 200° C. with between about 0.01 and about 1 part by weight per unit weight of said compound of a catalyst of approximately 100 per cent orthophosphoric acid for a period of time sufficient to effect polymerization and thereafter removing polymer of said thiophene compound as a reaction product.

10. A process for polymerization of a thiophene compound selected from the group consisting of thiophene and alkylthiophenes, which comprises contacting said compound at reflux temperature with between about 0.01 and about 1 part by weight per unit weight of said compound of a catalyst of approximately 100 per cent orthophosphoric acid for a period of time sufficient to effect polymerization and thereafter removing polymer of said thiophene compound as a reaction product.

11. A process for preparing a mixture consisting substantially of the trimeric and pentameric polymers of thiophene, which comprises contacting thiophene at a temperature of not less than about 50° C. with a catalyst of approximately 100 per cent orthophosphoric acid to yield a polymerized reaction product mixture, solvent-extracting thiophene polymer from said reaction product mixture, separating the resulting extractant solution of thiophene polymer from orthophosphoric acid and removing the extractant from said solution to yield a product consisting substantially of the trimer and pentamer of thiophene.

12. A process for preparing a mixture consisting substantially of the trimeric and pentameric polymers of an alkylthiophene, which comprises contacting an alkylthiophene at a temperature of not less than about 50° C. with a catalyst of approximately 100 per cent orthophosphoric acid to yield a polymerized reaction product mixture, solvent-extracting alkylthiophene polymer from said reaction product mixture, separating the resulting extractant solution of alkylthiophene polymer from orthophosphoric acid and removing the extractant from said solution to yield a product consisting substantially of the trimer and pentamer of alkylthiophene.

13. A process for preparing a mixture consisting substantially of the trimeric and pentameric polymers of methylthiophene, which comprises contacting methylthiophene at a temperature of not less than about 50° C. with a catalyst of approximately 100 per cent orthophosphoric acid to yield a polymerized reaction product mixture, solvent-extracting methylthiophene polymer from said reaction product mixture, separating the resulting extractant solution of methylthiophene polymer from orthophosphoric acid and removing the extractant from said solution to yield a product consisting substantially of the trimer and pentamer of methylthiophene.

14. A process for preparing the trimer of thiophene, comprising contacting thiophene at a temperature of not less than about 50° C. with a catalyst of approximately 100 per cent orthophosphoric acid to yield a polymerized reaction product mixture, solvent-extracting thiophene polymer from said reaction product mixture, separating the resulting extractant solution of thiophene polymer from orthophosphoric acid, removing the extractant from said solution to yield a residue of polymerized thiophene and distilling said residue to separate therefrom the trimer of thiophene.

15. A process for preparing the trimer of thiophene, comprising contacting thiophene with a catalyst of approximately 100 per cent orthophosphoric acid at a temperature of between about 50° C. and about 200° C. to yield a polymerized reaction product mixture, solvent-extracting thiophene polymer from said reaction product mixture, separating the resulting extractant solution of thiophene polymer from orthophosphoric acid, removing the extractant from said solution to yield a residue of polymerized thiophene and distilling said residue to separate therefrom the trimer of thiophene.

16. A process for preparing the trimer of an alkylthiophene, comprising contacting the alkylthiophene at a temperature of not less than about 50° C. with a catalyst of approximately 100 per cent orthophosphoric acid to yield a polymerized reaction product mixture, solvent-extracting alkylthiophene polymer from said reaction product mixture, separating the resulting extractant solution of alkylthiophene polymer from orthophosphoric acid, removing the extractant from said solution to yield a residue of polymerized alkylthiophene and distilling said residue to separate therefrom the trimer of alkylthiophene.

17. A process for preparing the trimer of methylthiophene, comprising contacting the methylthiophene at a temperature of not less than about 50° C. with a catalyst of approximately 100 per cent orthophosphoric acid to yield a polymerized reaction product mixture, solvent-extracting methylthiophene polymer from said reaction product mixture, separating the resulting extractant solution of methylthiophene polymer from orthophosphoric acid, removing the extractant from said solution to yield a residue of polmerized methylthiophene and distilling said residue to separate therefrom the trimer of methylthiophene.

HOWARD D. HARTOUGH.
SEYMOUR L. MEISEL.

REFERENCES CITED

The following references are of record in the file of this patent:

UNITED STATES PATENTS

| Number | Name | Date |
|---|---|---|
| 2,458,514 | Kellett | Jan. 11, 1949 |
| 2,458,520 | Kosak | Jan. 11, 1949 |